(12) United States Patent
Wang et al.

(10) Patent No.: US 11,178,040 B2
(45) Date of Patent: Nov. 16, 2021

(54) INTENT-BASED NETWORK VIRTUALIZATION DESIGN

(71) Applicant: VMware, Inc., Palo Alto, CA (US)

(72) Inventors: Ziyou Wang, Beijing (CN); Donghai Han, Beijing (CN); Mengdie Song, Beijing (CN); Rui Cao, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 61 days.

(21) Appl. No.: 16/808,393

(22) Filed: Mar. 4, 2020

(65) Prior Publication Data
US 2021/0218661 A1   Jul. 15, 2021

(30) Foreign Application Priority Data

Jan. 15, 2020   (WO) ................ PCT/CN2020/072192

(51) Int. Cl.
| | |
|---|---|
| *H04L 12/751* | (2013.01) |
| *H04L 12/24* | (2006.01) |
| *H04L 12/46* | (2006.01) |
| *H04L 12/715* | (2013.01) |
| *H04L 29/06* | (2006.01) |
| *H04L 12/713* | (2013.01) |
| *G06F 9/455* | (2018.01) |

(52) U.S. Cl.
CPC .......... *H04L 45/02* (2013.01); *G06F 9/45558* (2013.01); *H04L 12/4641* (2013.01); *H04L 41/0803* (2013.01); *H04L 41/12* (2013.01); *H04L 45/04* (2013.01); *H04L 45/586* (2013.01); *H04L 63/0218* (2013.01)

(58) Field of Classification Search
None
See application file for complete search history.

(56) References Cited

U.S. PATENT DOCUMENTS

| 10,375,121 B2 | 8/2019 | Hamou et al. | |
|---|---|---|---|
| 2019/0182276 A1 | 6/2019 | Tiagi et al. | |
| 2020/0162319 A1* | 5/2020 | Szigeti | .................... H04L 43/04 |

(Continued)

OTHER PUBLICATIONS

Author Unknown, Topology and Orchestration Specification for Cloud Applications Version 1.0, pp. 1-114 (Year: 2013).*

(Continued)

*Primary Examiner* — Christopher M Crutchfield
(74) *Attorney, Agent, or Firm* — Su IP Consulting

(57) ABSTRACT

Example methods and systems for intent-based network virtualization design are disclosed. One example may comprise: obtaining configuration information and traffic information associated with multiple virtualized computing instances, processing the configuration information and traffic information to identify network connectivity intents and mapping the network connectivity intents to a logical network topology template. Based on a first switching intent, a first group may be assigned to a first logical network domain and the logical network topology template configured to include a first logical switching element. Based on a second switching intent, a second group may be assigned to a second logical network domain and the logical network topology template configured to include a second logical switching element. Based on a routing intent, the logical network topology template may be configured to include a logical routing element.

21 Claims, 7 Drawing Sheets

(56) References Cited

U.S. PATENT DOCUMENTS

| | | | |
|---|---|---|---|
| 2020/0162467 A1* | 5/2020 | Panse | H04L 12/4641 |
| 2021/0036933 A1* | 2/2021 | Tofighbakhsh | H04L 41/22 |
| 2021/0064410 A1* | 3/2021 | Yun | G06F 9/44 |
| 2021/0105189 A1* | 4/2021 | Claise | H04L 41/5009 |
| 2021/0176142 A1* | 6/2021 | Clarke | H04L 41/5051 |

OTHER PUBLICATIONS

A H M Jakaria, M. Ashiqur Rahman and Carol Fung, Automated Synthesis of NFV Topology: A Security Requirement-Oriented Design, pp. 1-5 (Year: 2017).*

Rodrigo Emiliano, Mário Antunes, Automatic network configuration in virtualized environment using GNS3, pp. 1-6 (Year: 2015).*

Andrew Lerner, "Intent-based Networking", Gartner Blog Network, Feb. 7, 2017, Retrieved on Mar. 2, 2020 from Internet at URL <https://blogs.gartner.com/andrew-lerner/2017/02/07/intent-based-networking/>.

Benoit Donnet et al., "Internet Topology Discovery: A Survey", IEEE Communications Surveys & Tutorials, 4th Quarter 2007, pp. 56-69, vol. 9, No. 4.

Richard Black et al., "Ethernet Topology Discovery without Network Assistance", Proceedings of the 12th IEEE International Conference on Network Protocols, 2004, pp. 328-339.

Wael H. Gomaa et al., "A Survey of Text Similarity Approaches", International Journal of Computer Applications (0975-8887), Apr. 2013, pp. 13-18, vol. 68, No. 13.

Muhammad Shafiq et al., "Network Traffic Classification Techniques and Comparative Analysis Using Machine Learning Algorithms", 2nd IEEE International Conference on Computerand Communications, 2016, pp. 2451-2455.

Md. Faizul Bari et al., "Data Center Network Virtualization: A Survey", IEEE Communications Surveys & Tutorials, 2nd Quarter 2003, pp. 909-928, vol. 15, No. 2.

Luiz Andre Barroso et al., "The Datacenter as a Computer: An Introduction to the Design of Warehouse-Scale Machines", Synthesis Lectures on Computer Architecture, 2009.

* cited by examiner

INTENT-BASED NETWORK VIRTUALIZATION DESIGN

CROSS-REFERENCE TO RELATED APPLICATION

The present application claims the benefit of Patent Cooperation Treaty (PCT) Application No. PCT/CN2020/072192, filed Jan. 15, 2020, which is incorporated herein by reference.

BACKGROUND

Virtualization allows the abstraction and pooling of hardware resources to support virtualization computing instance such as virtual machines (VMs) in data center(s). For example, through compute virtualization (also known as hardware virtualization), VMs running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. Further, through network virtualization, logical overlay networks may be provisioned, changed, stored, deleted and restored programmatically without having to reconfigure the underlying physical hardware architecture in data center(s). In practice, however, existing users of compute virtualization technology may find it challenging, or lack the expertise, to adopt network virtualization solutions to enhance their data center(s).

DETAILED DESCRIPTION

Figure 1:
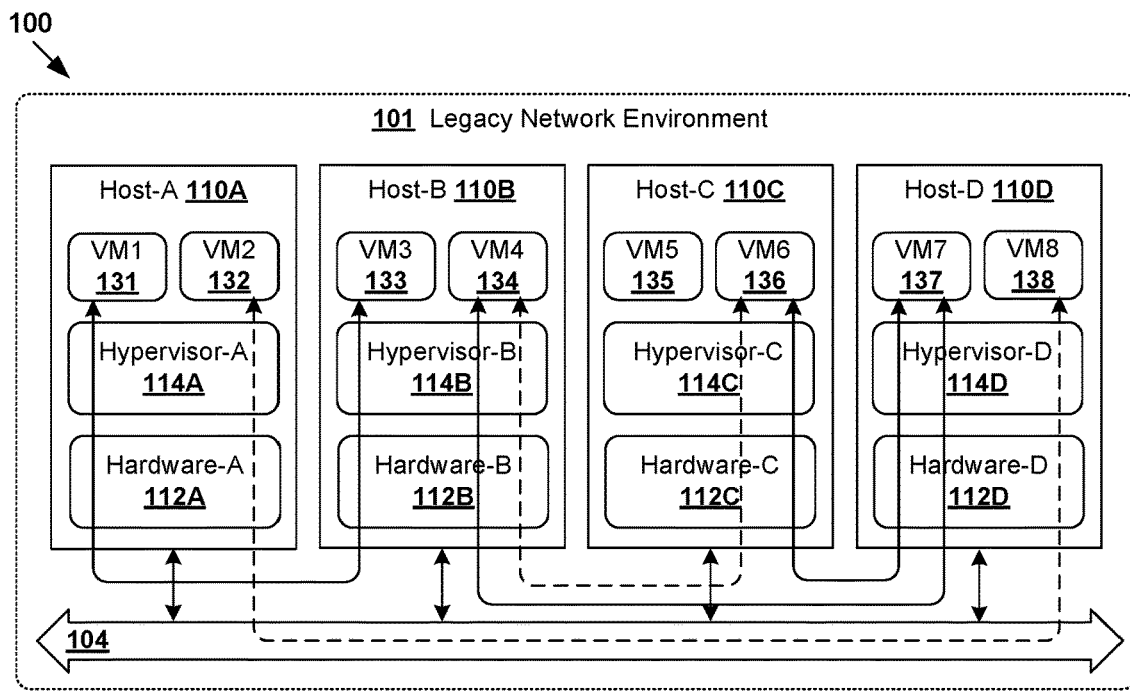
FIG. 1 is a schematic diagram illustrating an example intent-based network virtualization design may be performed for a network environment.
Figure 1:
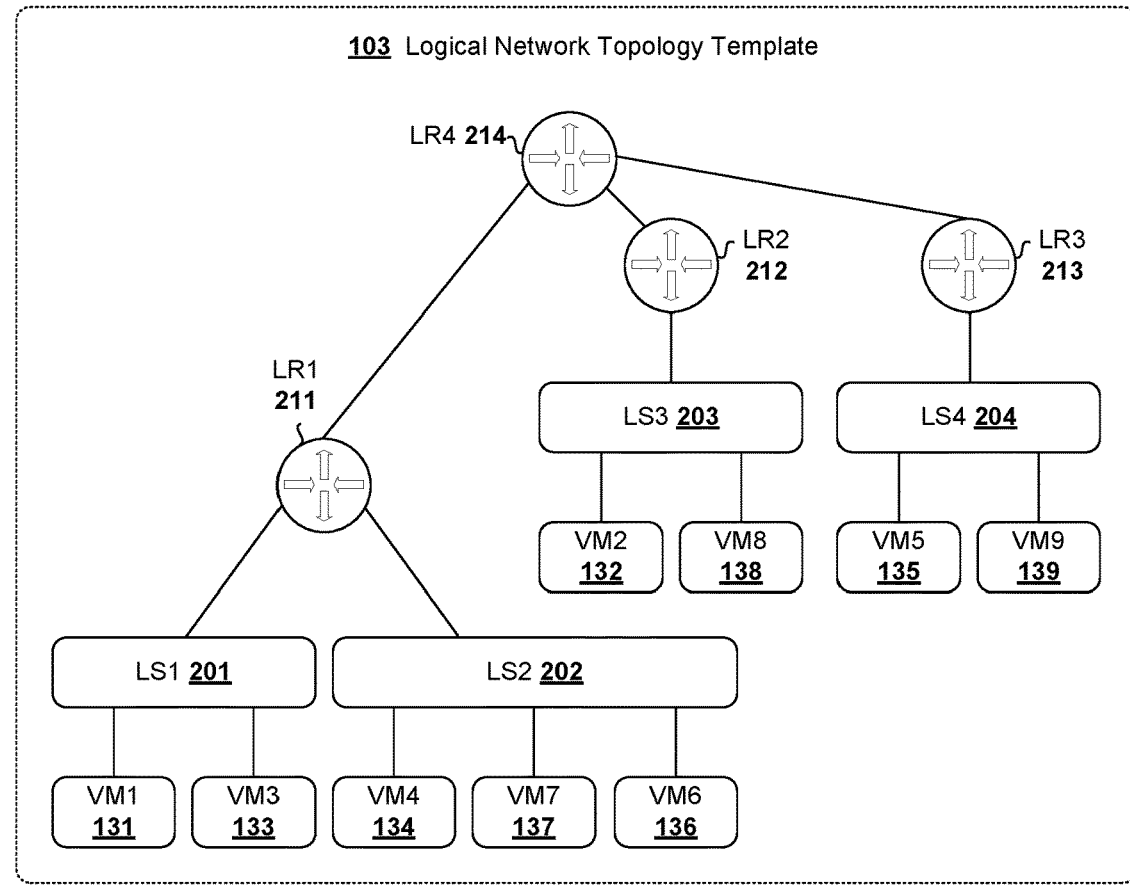

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first," "second" and so on are used to describe various elements, these elements should not be limited by these terms. These terms are used to distinguish one element from another. A first element may be referred to as a second element, and vice versa.

Challenges relating to network virtualization will now be explained in more detail using FIG. 1, which is a schematic diagram illustrating example intent-based network virtualization design 100 for network environment 101. It should be understood that, depending on the desired implementation, network environment 101 may include additional and/or alternative components than that shown in FIG. 1. Network environment 101 includes multiple hosts, such as host-A 110A, host-B 110B, host-C 110C and host-D 110D that are inter-connected via physical network 104. In practice, network environment 101 may include any number of hosts (also known as a "host computers", "host devices", "physical servers", "server systems", "transport nodes," etc.), where each host may be supporting tens or hundreds of VMs. Hosts 110A-D maintains data-plane connectivity with each other via physical network 104.

Each host 110A/110B/110C/110D may include suitable hardware 112A/112B/112C/112D and virtualization software (e.g., hypervisor-A 114A, hypervisor-B 114B, hypervisor-C 114C, hypervisor-D 114D) to support various virtual machines (VMs) 131-138. For example, host-A 110A supports VM1 131 and VM4 134; host-B 110B supports VMs 132-133; host-C 110C supports VMs 135-136; and host-D 110D supports VMs 137-138. Hypervisor 114A/114B/114C/114D maintains a mapping between underlying hardware 112A/112B/112C/112D and virtual resources allocated to respective VMs 131-138. The virtual resources may be used by each VM to support a guest operating system (OS) and application(s).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-D may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-4" to a network or Internet Protocol (IP) layer; and "layer-4" to a transport layer (e.g., using Transmission Control Protocol (TCP) and User Datagram Protocol (UDP), etc.), in the Open System Interconnection (OSI) model, although the concepts described herein may be used with other networking models.

In practice, users may find it challenging, or lack the expertise, to adopt network virtualization solutions to enhance their existing network environment 101. For example, current network virtualization solutions may require users to manually redefine their requirements and policies from scratch using new user interfaces or tools that are unfamiliar to them. For some users, they might have constructed and maintained data centers to satisfy their business needs for a long period of time. To leverage new software-defined networking (SDN) solutions, it is not easy for the users to reexamine the existing network configuration and repeat the configuration process in a different way. In other words, there is usually a steep learning curve for users to understand and apply network virtualization concepts. Some reasons are discussed below.

First, many business needs might be distributed and hidden behind current network topologies in network environment 101. For example, network environment 101 is generally not maintained by a single person in a large organization with stakeholders from network administrators to different business units. In some cases, existing employees might not have much knowledge of network environment 101, or some of its subsystems, because it was designed and deployed many years ago. In this case, a conventional approach involves solution engineers working carefully with users to learn more about network environment 101. This process requires many iterations and a long time to be accurate.

Second, network virtualization solutions are conceptually different from traditional networking solutions and users usually require experts to help them adopt the relatively new solutions. In practice, however, there might be a shortage of experts while the adoption rate is increasingly rapidly. For example, if experts need to work on a case-by-case basis from scratch, it will dramatically slow down the adoption of network virtualization solutions. Without the relevant expertise, users usually find it difficult to understand the mapping between their current network environment 101 and network virtualization solutions. In some cases, users simply give up when faced with these challenges.

Third, users themselves might lack understanding of network environment 101 and its characteristics. Such understanding is important when applying new solutions in software-defined networking. For example, without any insight into different flow patterns in network environment 101, it is difficult to apply new solutions relating to micro-segmentation in order to design effective distributed firewall rules. These challenges further discourage the adoption of network virtualization solutions, which is undesirable.

Intent-Based Network Virtualization Design

According to examples of the present disclosure, network virtualization design may be improved using an "intent-based" approach. Instead of necessitating users to learn difficult network virtualization concepts and/or fully understand existing network characteristics and configurations, examples of the present disclosure may be implemented to provide users with an automated, easy-to-use and time-saving solution for network virtualization design. In the example in FIG. 1, "network connectivity intents" may be obtained or mined from legacy network environment 101, and mapped to a logical network topology template (see 102-103). This way, the gap between intents and policies may be bridged to better satisfy business needs of users.

As used herein, the term "intent" may refer generally to goal, objective, purpose, desired behavior, business need or requirement associated with a network environment. In relation to network connectivity, the term "network connectivity intent" may refer generally to may refer a connectivity requirement to facilitate desired traffic flow(s) at runtime. The term "switching intent" may refer generally to an intra-domain connectivity requirement among VMs assigned to a particular network domain (e.g., layer-2 domains or segments). The term "routing intent" may refer generally to an inter-domain connectivity requirement between VMs assigned to a first network domain and those assigned to a second network domain.

Figure 2:
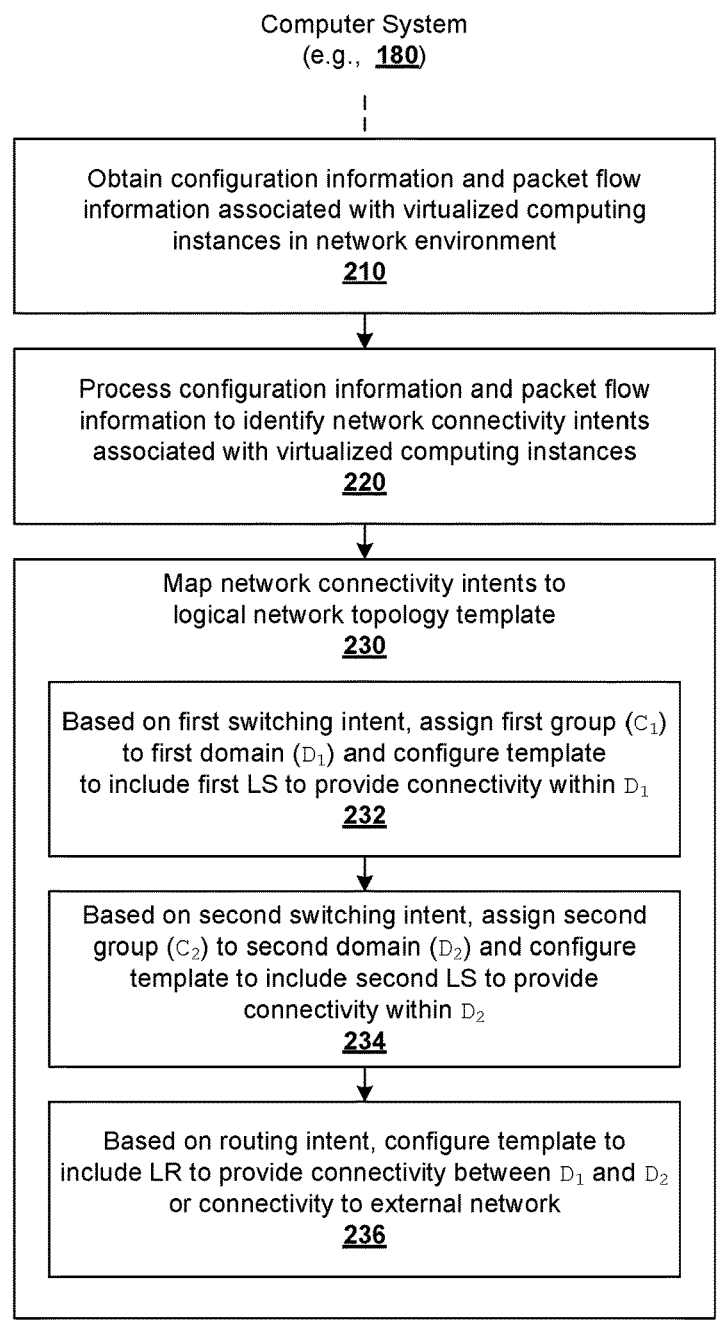
FIG. 2 is a flowchart of an example process for a computer system to perform intent-based network virtualization design for a network environment.
Figure 3:
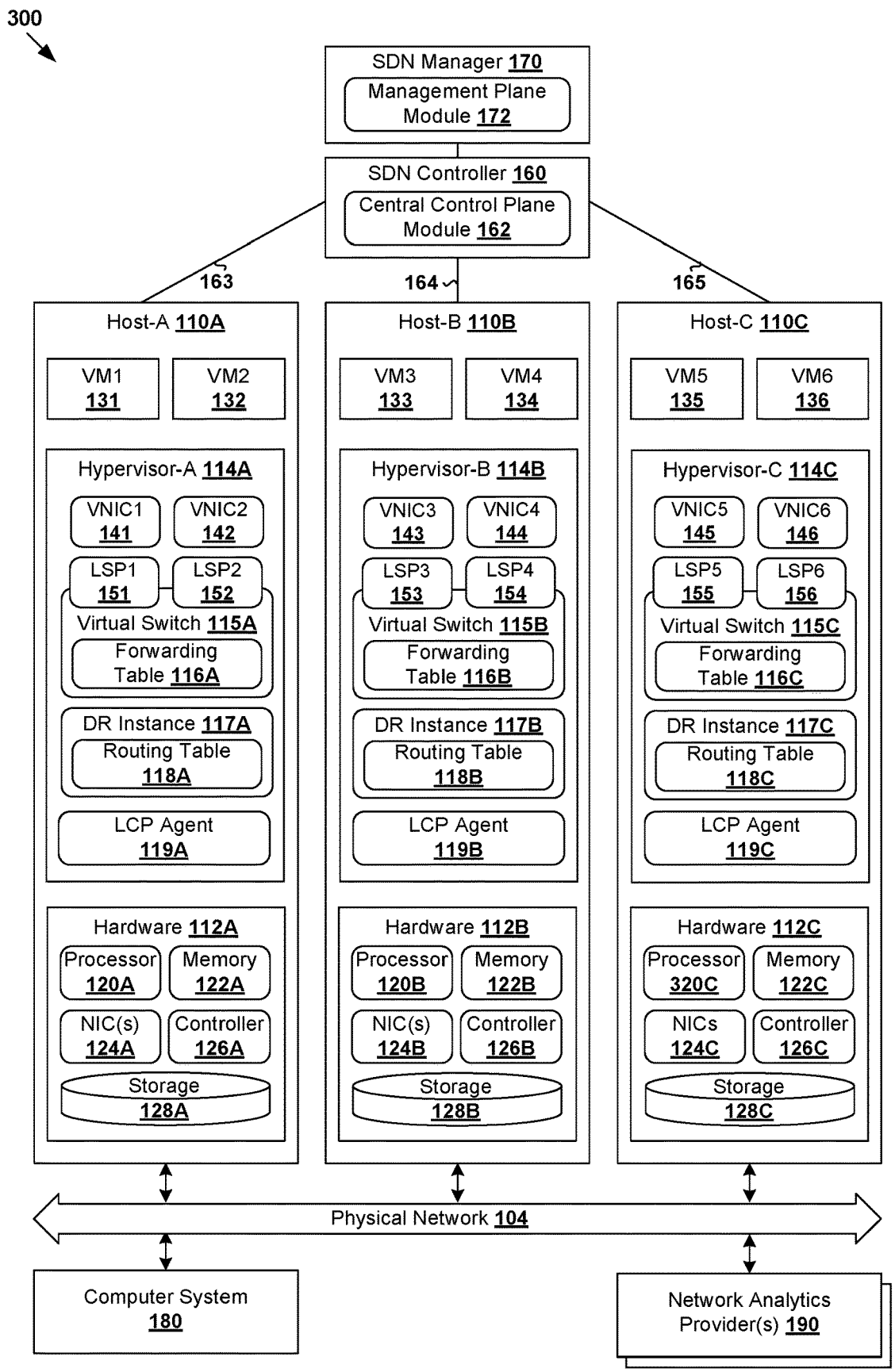
FIG. 3 is a schematic diagram illustrating an example physical implementation view of the network environment in FIG. 1.

In more detail, FIG. 2 is a flowchart of example process 200 for a computer system to perform intent-based network virtualization design for network environment 101. Example process 200 may include one or more operations, functions, or actions illustrated by one or more blocks, such as 210 to 236. The various blocks may be combined into fewer blocks, divided into additional blocks, and/or eliminated depending on the desired implementation. As will be discussed further using FIG. 3, examples of the present disclosure may be implemented using any suitable computer system 180. In the following, VMs 131-139 will be used as example "virtualized computing instances" in network environment 101. Note that VM9 139 may be supported by any of hosts 110A-D, or a different host (not shown for simplicity).

At 210 in FIG. 2, configuration information and runtime traffic information associated with VMs 131-139 deployed in network environment 101 may be obtained and processed to identify network connectivity intents associated with network environment 101. For legacy network environment 101 in FIG. 1, example configuration information associated with VMs 131-139 may include VM-related information, physical and/or virtual network topology information, etc. Example traffic information may identify runtime packet flows among VMs 131-139. For example, FIG. 1 shows packet flows between VM1 131 and VM3 133; VM2 132 and VM8 138; VM4 134 and VM6 136; VM4 134 and VM6 136, and VM6 136 and VM7 137.

At 220 and 230 in FIG. 2, network connectivity intents may be identified based on the configuration information and traffic information, and mapped to a logical network topology template. For example, the network connectivity intents may include (a) a first switching intent associated with a first group from VMs 131-139, (b) a second switching intent associated with a second group from VMs 131-139 and (c) a routing intent associated with the first group and/or the second group.

(a) At 232 in FIG. 2, based on a first switching intent, the first group may be assigned to a first logical network domain. In this case, logical network topology template 103 may be configured to include a first logical switching element (e.g., logical switch) to provide connectivity within the first logical network domain. For example in FIG. 1, based on packet flow(s) between VM1 131 and VM3 133 ("first group"), it is determined that VM1 131 and VM3 133 require network connectivity ("first switching intent"). In this case, VM1 131 and VM3 133 may be assigned to a first logical layer-2 domain and connected via first logical switch=LS1 201.

(b) At 234 in FIG. 2, based on a second switching intent, the second group may be assigned to a second logical network domain. In this case, the logical network topology template may be configured to include a second logical switching element to provide connectivity within the second logical network domain. For example in FIG. 1, based on packet flow(s) among VM4 134, VM6 136 and VM7 137 ("second group"), it is determined that these VMs require network connectivity ("second switching intent"). In this case, VM4 134, VM6 136 and VM7 137 may be assigned to a second logical layer-2 domain and connected via second logical switch=LS2 202.

(c) At 236 in FIG. 2, based on a routing intent, the logical network topology template may be configured to include a logical routing element (e.g., logical router) to provide connectivity between the first logical network domain and the second logical network domain, or connectivity to an external network, or both. For example in FIG. 1, logical network topology template 103 may include tier-1 logical router=LR1 211 to provide connectivity between the first logical layer-2 domain and second logical layer-2 domain. Logical network topology template 103 may also include tier-0 logical router=LR4 214 to provide connectivity to an external network.

As will be discussed further below, logical network topology template 103 may include any suitable number of logical switching elements (e.g., 201-204) and logical routing elements (e.g., 211-214) to satisfy respective switching and routing intents mined from legacy network environment 101. Using examples of the present disclosure, the gap between intents (i.e., what) and what the network actually delivers through network virtualization (i.e., how) may be bridged. In the following, various examples will be discussed using FIG. 3 to FIG. 7.

Physical Implementation View

Examples of the present disclosure may be implemented using any computer system(s) capable of performing intent-based network virtualization design, and hosts 110A-D capable of implementing network virtualization solutions specified by logical network topology template 103. An example will be discussed using FIG. 3, which is a schematic diagram illustrating example physical implementation view 300 of network environment 101 in FIG. 1. It should be understood that example 300 may include additional and/or alternative components than that shown in FIG. 3. Although not shown in FIG. 3, it should be understood that host-D 110D supporting VM7 137 and VM8 138 may include component(s) similar to that of hosts 110A-C.

Through compute virtualization, virtual resources may be allocated each VM, such as virtual guest physical memory, virtual disk, virtual network interface controller (VNIC), etc. In the example in FIG. 3, hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc. Hardware resources may be emulated using virtual machine monitors (VMMs). For example, VNICs 141-146 are emulated by corresponding VMMs (not shown for simplicity). The VMMs may be considered as part of respective VMs 131-136, or alternatively, separated from VMs 131-136. Although one-to-one relationships are shown, one VM may be associated with multiple VNICs (each VNIC having its own network address).

Through network virtualization, logical switches and logical routers may be implemented in a distributed manner and can span multiple hosts to connect VMs 131-139 in FIG. 1. For example, hypervisor 114A/114B/114C implements virtual switch 115A/115B/115C and logical distributed router (DR) instance 117A/117B/117C to handle egress packets from, and ingress packets to, corresponding VMs 131-136. To satisfy switching intents in network environment 101, logical switches (e.g., 201-204) may be implemented to provide logical layer-2 connectivity. A particular logical switch may be collectively by multiple virtual switches (e.g., 115A-C) and represented internally using forwarding tables (e.g., 116A-C) at respective virtual switches. Forwarding tables 116A-C may each include entries that collectively implement the respective logical switches. Further, to satisfy routing intents, logical DRs (e.g., 211-214) may be implemented to provide logical layer-4 connectivity. A particular logical DR may be implemented collectively by multiple DR instances (e.g., 117A-C) and represented internally using routing tables (e.g., 118A-C) at respective DR instances. Routing tables 118A-C may each include entries that collectively implement the respective logical DRs.

Packets may be received from, or sent to, each VM via an associated logical switch port. For example, logical switch ports 151-156 (labelled "LSP1" to "LSP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches, whereas a "virtual switch" may refer generally to a software switch or software implementation of a physical switch. In practice, there is usually a one-to-one mapping between a logical port on a logical switch and a virtual port on a virtual switch. However, the mapping may change in some scenarios, such as when the logical port is mapped to a different virtual port on a different virtual switch after migration of the corresponding VM (e.g., when the source host and destination host do not have a distributed virtual switch spanning them).

Through network virtualization, logical overlay networks may be provisioned, changed, stored, deleted and restored programmatically without having to reconfigure the underlying physical hardware architecture. Here, a logical overlay network (also known as "logical network") may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-4 network that uses tunnel encapsulation to extend layer-2 segments across multiple hosts. Hypervisor 114A/114B/114C may implement a virtual tunnel endpoint (VTEP) to encapsulate and decapsulate packets with an outer header (also known as a tunnel header) identifying the relevant logical overlay network (e.g., VNI=6000). For example in FIG. 1, hypervisor-A 114A implements a first VTEP associated with (IP address=IP-A, MAC address=MAC-A). Hypervisor-B 114B implements a second VTEP with (IP-B, MAC-B), and hypervisor-C 114C a third VTEP with (IP-C, MAC-C). Encapsulated packets may be sent via a tunnel established between a pair of VTEPs over physical network 104, over which respective hosts are in layer-4 connectivity with one another.

SDN controller 160 and SDN manager 170 are example network management entities that facilitate management of various entities in network environment 101. An example SDN controller is the NSX controller component of VMware NSX® (available from VMware, Inc.) that resides on a central control plane (CCP), and connected to SDN manager 170 (e.g., NSX manager) on a management plane (MP). See also CCP module 162 and MP module 172. Each host 110A/110B/110C may implement local control plane (LCP) agent 119A/119B/119C to maintain control-plane connectivity with management entities 160-170. For example, control-plane channel 163/164/165 may be established between SDN controller 160 and respective hosts 110A-C using TCP over Secure Sockets Layer (SSL), etc. Management entity 160/170 may be implemented using physical machine(s), virtual machine(s), a combination thereof, etc.

According to examples of the present disclosure, computer system 180 may interact with management entity 160/170, network analytics provider(s) 190 and hosts 110A-D to collect and mine various system information from legacy network environment 101. Once sufficient information is mined and analyzed, computer system 180 may automatically identify network connectivity intents and map them to logical network topology template 103 to satisfy those intents. Since network connectivity intents are automatically mined from legacy network environment 101, the resulting logical network topology template 103 provides a much better starting point for network virtualization design, especially compared to conventional approaches that start from scratch. Logical network topology template 103 may be recommended as a blueprint for further refinement(s) by solution engineers and/or end users.

Configuration and Traffic Information Mining

Figure 4:
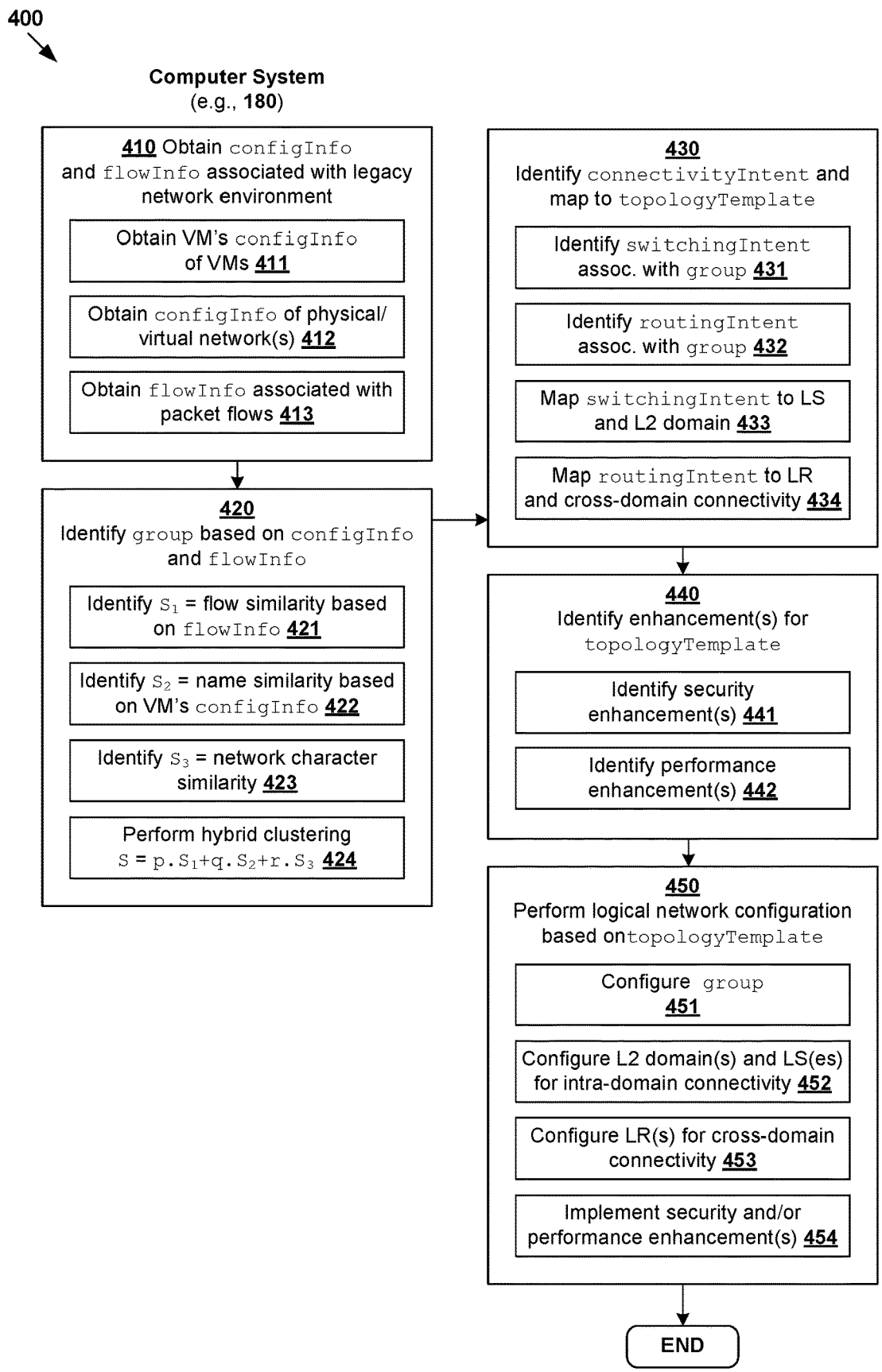
FIG. 4 is a flowchart of an example detailed process for a computer system to perform intent-based network virtualization design for a network environment.

FIG. 4 is a flowchart of example detailed process 400 for intent-based network virtualization design. Example process 400 may include one or more operations, functions, or actions illustrated at 410 to 450. The various operations, functions or actions may be combined into fewer blocks, divided into additional blocks, and/or eliminated depending on the desired implementation.

At 410 in FIG. 4, configuration information 411-412 and traffic information 413 associated with legacy network environment 101 may be obtained. The term "obtain" may refer generally to computer system 180 receiving, retrieving or mining information from any suitable source(s), such as SDN manager 170, SDN controller 160, network analytics provider(s) 170, hosts 110A-D, any combination thereof, etc.

VM configuration information 411 may be obtained to gain insight as to how the data center is administered, such as VM name, VM ID, VNIC information, address information (e.g., IP address, IP subnet and MAC address), label(s) or metadata assigned to VM (e.g., "db" and "webserver"), etc. Network configuration information 412 may be obtained to gain insight into existing physical and/or virtual network topologies. For example, physical network topology information may be obtained using automatic discovery, such as using Simple Network Management Protocol (SNMP) or any other protocol. Virtual and/or physical network topology information may be obtained from network analytics provider(s) 190, such as VMware vRealize® suite (e.g., vRealize Network Insight (VRNI) available from VMware, Inc. or similar tool(s).

Traffic information 413 (also referred to as "packet flow information") may be mined to gain insight into runtime traffic flows or patterns among VMs 131-139. For example, a typical 4-tier web application usually has clear traffic patterns between each two neighboring tiers. Packet flow information 413 may include any suitable attribute(s), such as source MAC/IP address information, destination MAC/IP address information, port number, protocol(s), flow metrics (e.g., data size), etc. In practice, packet flow information 413 may be obtained from network analytics provider(s) 190, such as NetFlow Logic (a trademark of NetFlow Logic Corporation) capable of collecting IP packet information. Any other tool(s) may be used, such as Internet Protocol Security (IPSEC) feature, etc. In the case, information 411-413 may identify relationships among VMs 131-139, such as based on whether they are assigned to the same security networking domain according to IPSEC.

VM Clustering

According to examples of the present disclosure, automatic VM clustering may be performed based on configuration information 411-412 and packet flow information 413. For example, at 420 in FIG. 4, VMs 131-139 may be grouped or clustered based on configuration information 411-412 and packet flow information 413 to facilitate subsequent network connectivity intent mining. The automatic approach should be contrasted against conventional approaches that require, for example, users to manually tag VMs in order to assign them into different groups.

In practice, a group may provide a coarse-grained view for users to define networkwide relations among different VM groups rather than single VM. A group may be defined as a basic building block to which policies are applicable. In general, clustering may refer generally to a technique for partitioning a set of objects (e.g., virtual machines) into various clusters based on whether the objects have similar or dissimilar characteristics. Any suitable clustering algorithm may be used, such as graph clustering (e.g., Markov clustering), k-means clustering, hierarchical clustering, density-based clustering, grid-based clustering, model-based clustering, any combination thereof, etc. Some related examples may be found in U.S. Pat. No. 10,375,121 and United States Patent Publication No. 2019/0182276, the content of which is incorporated herein in its entirety.

During micro-segmentation, the aim of clustering is to partition a set of N VMs into multiple clusters or groups, each representing a subset of the N virtual machines that have more similarity among them compared to those in a different cluster. In the following, an example hybrid clustering algorithm will be used to calculate VM similarities and identify VM groups according to the similarities. The algorithm may assign VMs 131-139 to various group(s) based on any suitable similarity indicator(s), such as traffic flow similarity (see 421), VM name similarity (see 422), network character similarity (see 423), etc.

(a) Traffic Similarity

At 421 in FIG. 4, traffic flow connection is an important factor to evaluate VM correlation. The basic observation is VMs which have more traffic between them are more likely belong to the same cluster. Using protocols such as IP flow information export (IPFIX) and NetFlow, packet flow information 413 may be used to determine the connectivity between two VMs. If the packet size transferred between two VMs is larger than a predefined threshold, they are considered to be connected. Otherwise, they are considered to be unconnected.

Traffic flow connections may be analyzed using a graph (G), such as by marking each VM as a node in the graph and add an edge between two VMs if they are connected. The task of identifying VM clusters involves finding all the connected components in an undirected graph. Any suitable search algorithm may be used, such as both depth-first search and breath-first search for finding these connected components. After finding out all the connected components in the graph, a vector space model may be used to represent each VM by a N-dimensional vector, where N is the number of connected components in the graph.

For example, if there are five connected components, there will be five VM clusters. A VM belonging to the first cluster may be represented as vector $\vec{A}=(1, 0, 0, 0, 0)$, VM belongs to the second group as vector $\vec{B}=(0, 1, 0, 0, 0)$, and so on. The similarity between these two VMs may be determined based on a cosine similarity between these two vectors as follows:

$$\text{similarity}(S_1) = \cos(\theta) = \frac{\vec{A} \times \vec{B}}{|\vec{A}||\vec{B}|}$$

For VMs assigned to the same cluster according to their packet flow information 413, their VM similarity value is one (i.e., $S_1=1$). For VMs assigned to different clusters, their VM similarity value is zero (i.e., $S_1=0$).

(b) VM Name Similarity

At 422 in FIG. 4, it is observed that network administrators of a data center tend to follow a naming convention to name VMs based on their ownerships and functions for better management. For example, VMs in the same department or owned by the same tenant are likely to have similar names. Based on this observation, VMs may be grouped based on their name using any suitable text similarity approach, such as string-based, corpus-based, knowledge-based, or any combination thereof. String-based approaches may be further divided into character- and term-based approaches.

For example, Edit Distance (or Levenshtein Distance) is a character-based approach to calculate text similarity based on the assumption that VMs belonging to the same group tend to have same or similar prefixes. The algorithm may define a distance between two strings by counting the minimum number of edit operation(s) needed to transform one string into another. An edit operation may be defined as adding, deleting or replacing a text character in a string. If the number of edit operations between two VM names is small, it indicates these two VM have identical names and are probably belonged to the same cluster. The name similarity between a pair of VMs denoted as (VMi, VMj) may be calculated as follows:

$$\text{similarity}(S_2) = 1 - \frac{editDistance(VMi, VMj)}{\max(len(VMi), len(VMj))}$$

The VM name similarity ($S_2$) may range from 0 to 1. For example, a higher value (e.g., $S_2=0.9$) indicates that two VMs are more likely to be in the same group.

(c) Network Character Similarity

At 423 in FIG. 4, network characters may be used as an auxiliary factor for clustering VMs. Any suitable network character(s) may be identified, such as IP subnets, IP addresses, VLAN IDs, any combination thereof, etc. For example, VMs that share the same subnet IP address, or are tagged with the same VLAN ID, are more likely to be in the same group. To identify network character similarity, network configuration information 413 obtained from management entity 160/170 may be analyzed to identify existing IP subnets and VLAN IDs, then convert them to a vector.

For example, consider a scenario where there are three IP subnets (172.16.10.0/24, 172.16.20.0/24, 172.16.30.0/24) and three VLAN ID (100, 200, 400) in network environment 101. In this case, a VM may be represented using a 6-dimentional vector. If a particular configuration is true, its corresponding value is set as 1; otherwise 0. For a first VM associated with IP subnet=172.16.20.1 and VLAN ID=200, the first VM may be represented using vector $\vec{V}=(0, 1, 0, 0, 1, 0)$. For a second VM associated with IP subnet=172.16.20.1 and VLAN ID=100, the second VM may be represented using vector $\vec{W}=(0, 1, 0, 1, 0, 0)$. The similarity between these two VMs may be determined based on a cosine similarity, where $$\text{similarity}(S_3) = \cos(\theta) = \frac{\vec{V} \times \vec{W}}{|\vec{V}||\vec{W}|}$$

The value of network character similarity may range between 0 to 1. For VMs assigned to the same cluster based on their network character(s), their network character similarity value may be one ($S_3=1$). Otherwise, their network character similarity value may be zero ($S_3=0$).

(d) Hybrid Clustering

At 424 in FIG. 4, hybrid clustering may be performed to identify VM similarities based on indicators 421-423 as follows:

$$S = p \cdot S_1 + q \cdot S_2 + r \cdot S_3.$$

Here, $S_1$, $S_2$ and $S_3$ represent packet flow similarity (see 421), VM name similarity (see 422) and network character similarity (see 423), respectively. Note that $S_1$, $S_2$ and $S_3$ each range between 0 and 1. The sum of corresponding weights or ratios is one (i.e., $p+q+r=1$). In practice, these weights may be set according to different situations. For a multi-tenant environment, for example, a higher priority (p) may be assigned to traffic flow similarity indicator ($S_1$) for identifying different tenants having low or even no traffic between them.

(e) Service Classification and Nested Clustering

Depending on the desired implementation, a group (also known as a nested group) identified at block 420 may include multiple subgroups. For example, a first level of grouping may involve VMs associated with the same tenant or department to the same group. Within this group, VMs may be further divided into different subgroups based on the services they provide within a particular tenant or department. In practice, traffic patterns from flow information 411 may be analyzed to further identify services provided by the VMs, as well as network applications or protocol(s) implemented in network environment 101.

In practice, any suitable classification approach may be used, such as based on port-based techniques, payload-based techniques, machine-learning techniques, etc. Port-based classification may be the most straightforward way to identify different services based on well-known exposed port numbers. For example, SDN controller 160 may use port number=1235. When many traffic flows to destination port 1235 are detected, the destination may be identified to be SDN controller 160. For more complicated circumstances, accuracy may be improved using a fine-grained investigation into similarities of VM information. Machine learning technique(s) may also be used to analyze and classify traffic flows.

Network Connectivity Intent Mapping

At 430 in FIG. 4, network connectivity intents may be identified and mapped to logical network topology template 103 to facilitate network virtualization. In practice, when trying to migrate legacy network environment 101 to a new logical network topology, connection(s) and isolation(s) among VMs 131-139 should be maintained. To achieve the desired connectivity state at runtime, VM groups identified at block 420 may be fit to logical network topology template 103 that satisfies network connectivity intents mined from network environment 101. In practice, network connectivity intents may include (a) switching intents and (b) routing intents.

At 431 in FIG. 4, switching intents associated with VMs 131-139 may be identified. In practice, out of consideration of security or application requirements, network administrators tend to connect VMs that communicate directly with each other to same switching network. As such, a group of VMs satisfying this condition may be assigned to a particular network domain, such as a logical layer-2 domain or segment. A switching intent may represent a connectivity requirement for intra-domain communication. In practice, VMs assigned to the same layer-2 domain share the same IP subnet and broadcast domain. Depending on the number of VMs in the group, a layer-2 domain may be implemented using single logical switch or multiple inter-connected logical switches. In some cases, VLAN-based technology may be used to maintain isolation among multiplex switching devices in large legacy data centers.

At 432 in FIG. 4, routing intents associated with VMs 131-139 may be identified. Routing intents may represent inter-domain connectivity requirements, such as between a first group of VMs assigned to a first layer-2 domain and a second group assigned to a second layer-2 domain. For example, routing may be needed within a particular tenant's network or across multiple networks belonging to different tenants.

Logical Network Topology Template

At 430 in FIG. 4, network connectivity intents may be mapped to logical network topology template 103 to, for example, support the description and the composition of corresponding switching and routing intents. To reduce the mapping cost, the architecture of logical network topology template 103 may be designed to be substantially simple and effective, such as by reducing or removing any redundant components or connections. Logical network topology template 103 may be designed to provide proper abstraction of corresponding network connectivity intents, and integrate seamlessly with existing policy interfaces supported by management entity 160/170. As will be discussed below, logical network topology template 103 may be configured to include logical switching elements (e.g., logical switches) and logical routing elements (e.g., logical routers) to satisfy switching and routing intents.

(a) Switching Intent Mapping

At 433 in FIG. 4, switching intents may be mapped or converted to logical switch(es) in logical network topology template 103. Based on a switching intent, a group of VMs may be assigned to a layer-2 domain to facilitate communication with each other through a layer-2 protocol. In this case, switching intent mapping may involve identifying a set of layer-2 domains. For example, in legacy network environment 101, layer-2 domains may be grouped using VLAN technology, and VMs in the same VLAN are generally assigned to the same subnet and share the same broadcast domain. Based on this knowledge, layer-2 domains may be identified based on VLAN membership associated with VMs 131-139.

Figure 5:
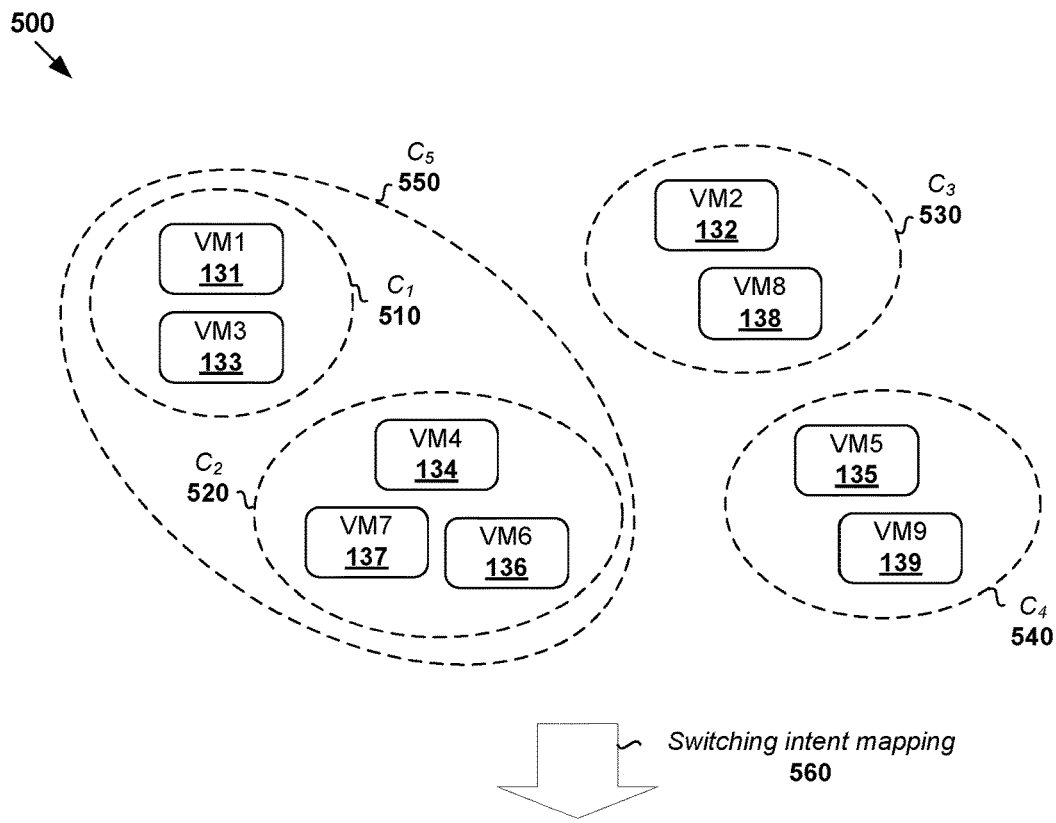
FIG. 5 is a schematic diagram illustrating a first example of network connectivity intent identification and mapping based on switching intents.
Figure 5:
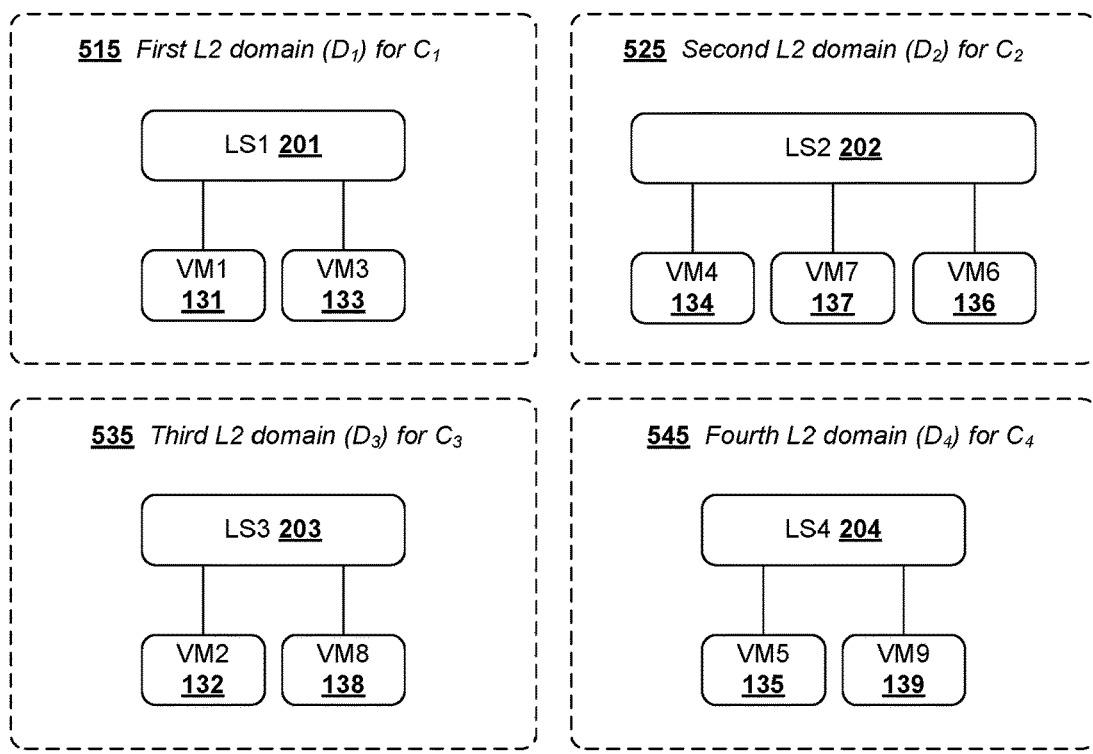

FIG. 5 is a schematic diagram illustrating first example 500 of network connectivity intent identification and mapping based on switching intents. At 510-550, various groups (also referred to as "clusters") may be identified using a clustering algorithm according to block 420. At 560, switching intents associated with groups 510-550 may then be mapped to logical network topology template 103.

(1) In more detail, first group ($C_1$) 510 may include VM1 131 and VM3 133 supported by respective host-A 110A and host-B 110B. Based on their switching intent for layer-2 connectivity and the same broadcast domain, first group ($C_1$) 510 may be assigned to a first layer-2 domain ($D_1$) 515 and connected via logical switch=LS1 201.

(2) Second group ($C_2$) 520 may include VM4 134, VM6 136 and VM7 137 supported by respective hosts 110B-D. Based on their switching intent for layer-2 connectivity and the same broadcast domain, second group ($C_2$) 520 may be assigned to a second layer-2 domain ($D_2$) 525 and connected via LS2 202.

(3) Third group ($C_3$) 530 may include VM2 132 and VM8 138 supported by respective host-A 110A and host-D 110D. Based on their switching intent for layer-2 connectivity and the same broadcast domain, third group ($C_3$) 530 may be assigned a third layer-2 domain ($D_3$) 535 and connected via LS3 203.

(4) Fourth group ($C_4$) 540 may include VM5 135 and VM9 139 supported by host-C 110C and another host (not shown), respectively. Based on their switching intent for layer-2 connectivity and the same broadcast domain, fourth group ($C_4$) 540 may be assigned a fourth layer-2 domain ($D_4$) 545 and connected via LS4 204.

(5) Through nested clustering, first group ($C_1$) 510 and second group ($C_2$) 520 may be members (i.e., sub-groups) of a larger group ($C_5$) 550. In practice, both groups 510-520 may be associated with the same tenant, but provide different services within a particular tenant's network.

(b) Routing Intent Mapping

At 434 in FIG. 4, routing intents associated with inter-domain connectivity may be mapped or converted to logical routing element(s) in logical network topology template 103. Depending on the desired implementation, there may be multiple logical routers residing on different tiers. In practice, a multi-tier logical network topology may be used to isolate multiple tenants. For example, a two-tier topology includes an upper tier (i.e., tier-0) associated with a provider logical router (PLR) and a lower tier (i.e., tier-1) associated with a tenant logical router (TLR). In this case, a logical router may be a tier-0 or tier-1 logical router.

Figure 6:
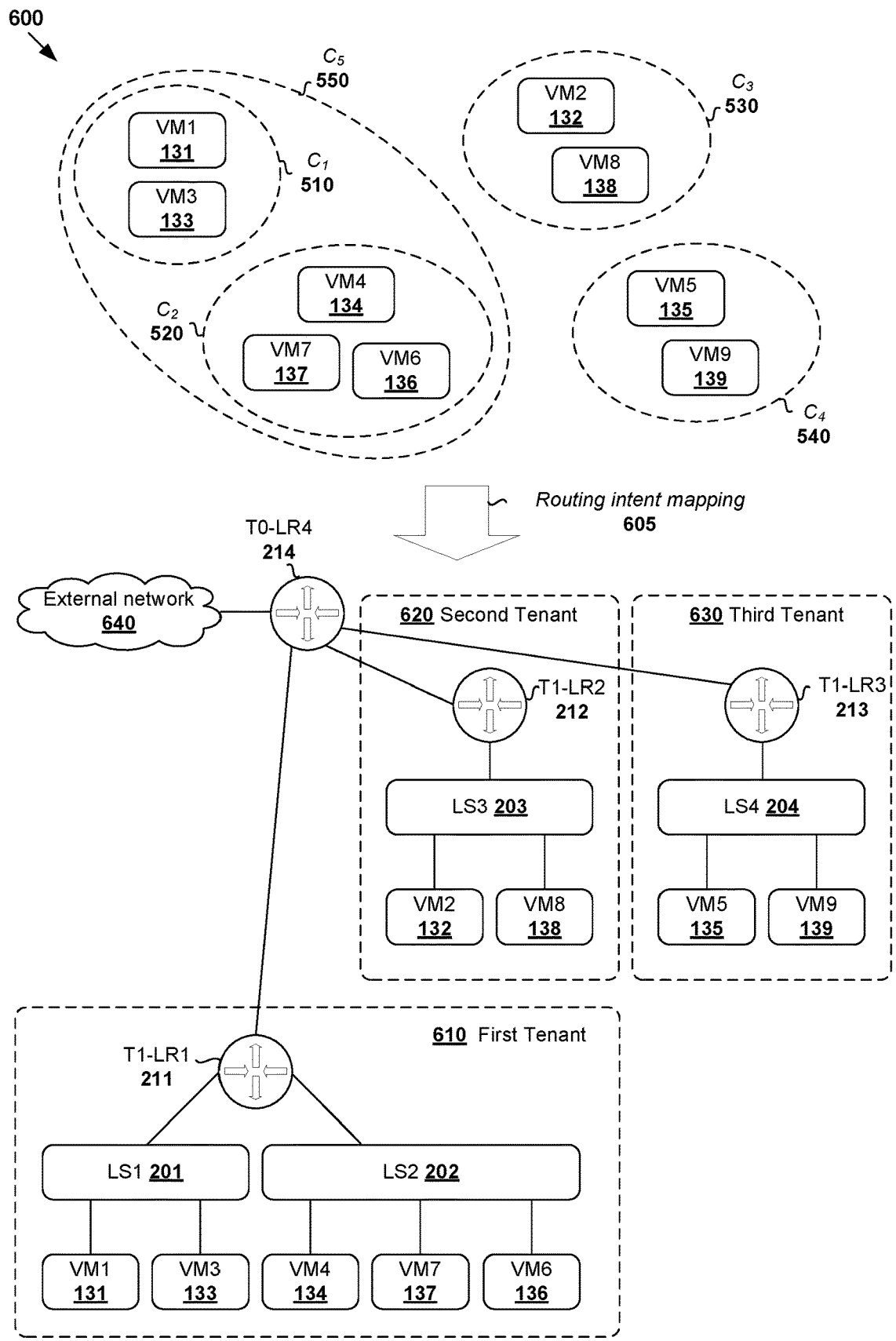
FIG. 6 is a schematic diagram illustrating a second example of network connectivity intent identification and mapping based on routing intents.

FIG. 6 is a schematic diagram illustrating second example 600 of network connectivity intent identification and mapping based on routing intents. In practice, routing intent mapping (see 605) may consider intra-tenant routing intents for a particular tenant and inter-tenant routing intents for multiple tenants. Some examples are discussed below.

(1) Based on a routing intent for connectivity between layer-2 domains associated with first tenant 610, logical network topology template 103 may be configured to include tier-1 logical router=T1-LR1 211. In this case, T1-LR1 211 may be deployed to provide intra-tenant connectivity between first network domain ($D_1$) 515 and second network domain ($D_2$) 525 of the same tenant. In practice, a tier-1 logical router may be owned and configured by a particular tenant and offers gateway service(s) to logical switches for east-west traffic.

(2) Based on a routing intent for connectivity with external network 640, logical network topology template 103 may be configured to include tier-0 logical router=T0-LR4 214 to facilitate north-south traffic. In this case, T0-LR4 214 may be owned and configured by provider (e.g., infrastructure administrator). The logical router may act as gateway between internal logical network and external networks, and responsible for bridging the network between different tenants. A tier-0 router may also be used to describe routing intents between tenants and all intents for north-south traffic.

(3) Based on a routing intent for connectivity between different tenants 610-630 in FIG. 6, logical network topology template 103 may be configured to include tier-1 logical router(s) that connect with T0-LR4 214. For example, T1-LR2 212 is associated with second tenant 620 and connected with LS3 203. T1-LR3 213 is associated with third tenant 630 and connected with LS4 204. This way, groups 510-550 may interact with each other via T0-LR4 214.

Template Enhancement(s)

At 440 in FIG. 4, any suitable enhancement(s) to logical network topology template 103 may be identified, such as security enhancement through micro-segmentation (see 441), performance enhancement (see 442), etc. For example, to help customers to adopt micro-segmentation in a policy-based network, clustering results (see 420) and packet flow information (see 410) collected from network environment 101 may be used.

Figure 7:
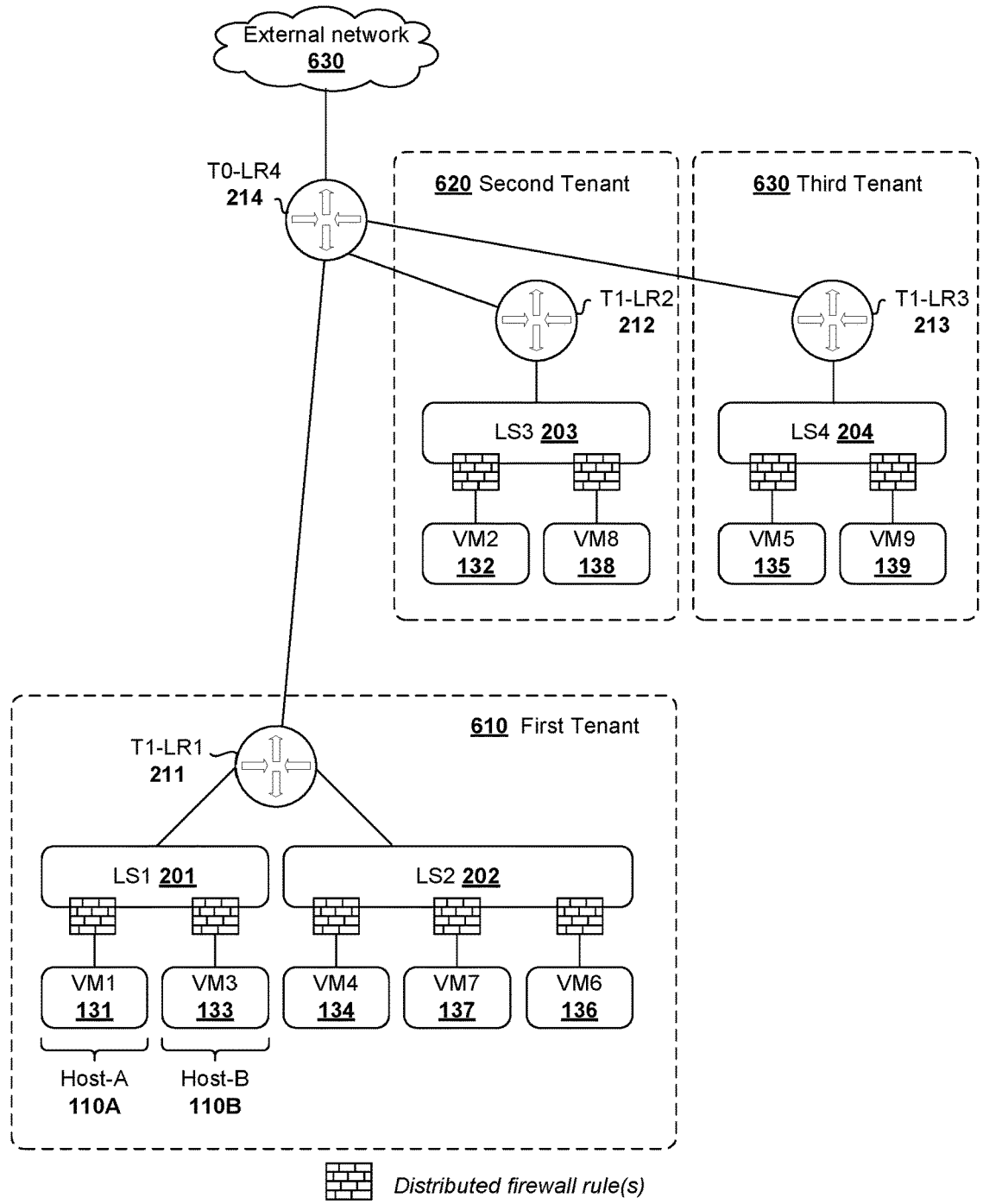
FIG. 7 is a schematic diagram illustrating example enhancement of a logical network topology template.

FIG. 7 is a schematic diagram illustrating example enhancement 700 of logical network topology template 103. In this example, it is observed that packet flows between two groups usually have some patterns after VM grouping for different tenants, and additional grouping based on different services they provide. For example, in the clustering step, web servers, application servers and database servers may be clustered into three separate groups. Distributed firewall rules may be configured and applicable at logical ports (e.g., 151-156) associated with respective VMs.

In one example, distributed firewall rule(s) may be configured to allow flows between a web server group and an application server group having the same destination port number. In another example, distributed firewall rule(s) to isolate different groups, such as to block traffic between a web server group and a databased group. Depending on the desired implementation, these two groups may be totally isolated using firewall rule(s) to reduce the likelihood of security risks. Additional firewall rules may be proposed to allow management traffic with management entity 160/170 and hosts 110A-D.

Performance enhancement(s) may include any optimization to improve performance metric(s) associated with VMs 131-139. For example, for a pair of VMs that communicate frequently (e.g., VM1 131 and VM3 133), they may be migrated to the same host for better traffic performance. Any alternative and/or additional enhancement(s) may be performed.

Automatic Reconfiguration

At 450 in FIG. 4, legacy network environment 101 may be automatically reconfigured to facilitate intent-based network virtualization discussed above. Based on the network connectivity intents in the examples in FIGS. 5-7, legacy network environment 101 may be reconfigured according to logical network topology template 103, or a modification thereof (e.g., based on user's approval and/or feedback). Here, the term "modification" may refer generally to addition, removal or adjustment of element(s) proposed in template 103.

For example, at 451 in FIG. 4, multiple groups may be configured based on the VM clustering results at block 420. Using the example in FIG. 7, the following may be configured: first group 510 ($C_1$)=(VM1 131, VM3 133); second group 520 ($C_2$)=(VM4 134, VM6 136, VM7 137); third group 530 ($C_3$)=(VM2 132, VM8 138); fourth group 540 ($C_4$)=(VM5 135, VM9 139) and fifth group 550 $C_5$=$C_1$+$C_2$.

At 452 in FIG. 4, layer-2 domains and associated logical switches may be configured based on template 103 (or a modification thereof). For example, first layer-2 domain 515 may be configured to include LS1 201 that provides intra-domain connectivity for first group 510 ($C_1$). This may involve connecting (VM1 131, VM3 133) in first group 510 to respective logical switch ports of LS 201. Similarly, second layer-2 domain 525 may be configured to include LS2 202 to provide intra-domain connectivity for second group 520. Third layer-2 domain 535 may be configured to include LS3 203 to provide intra-domain connectivity for third group 530 ($C_3$), and fourth layer-2 domain 545 that includes LS4 204 for fourth group 540 ($C_4$).

At 453 in FIG. 4, tier-1 logical routers 211-213 and tier-0 logical router 214 may be configured based on template 103 (or a modification thereof). For example, First T1-LR1 211 may be configured to provide inter-domain connectivity for VMs connected to LS1 201 and LS2 202. Second T1-LR2 212 and third T1-LR3 may be configured to connect respective LS3 203 and LS4 204 to T0-LR4 214, and therefore external network 630. See also FIG. 6.

At 454 in FIG. 4, any suitable enhancement(s) may be made to template 103 according to the example in FIG. 7 may be implemented. For example, distributed firewall rules may be configured to allow or block traffic flows between groups. In practice, example configurations 452-458 may be implemented using SDN manager 170 to generate and send control information to hosts 110A-C via SDN controller 160. Based on the control information, hosts 110A-C may implement groups 510-550, logical switches 201-204, logical routers 211-214, network policies (e.g., distributed firewall rules), or any combination thereof, etc. Any alternative and/or additional configuration operation(s) may be implemented to facilitate intent-based networking.

Container Implementation

Although explained using VMs 131-139, it should be understood that network environment 101 may include other virtual workloads, such as containers, etc. As used herein, the term "container" (also known as "container instance") is used generally to describe an application that is encapsulated with all its dependencies (e.g., binaries, libraries, etc.). For example, container technologies may be used to run various containers inside respective VMs131-139. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 7. For example, the instructions or program code, when executed by the processor of the computer system, may cause the processor to perform intent-based network virtualization design according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a computer system to perform intent-based network virtualization design for a network environment, wherein the method comprises:
    obtaining configuration information and traffic information associated with multiple virtualized computing instances deployed in the network environment;
    processing the configuration information and traffic information to identify network connectivity intents that include (a) a first switching intent associated with a first group from the multiple virtualized computing instances, (b) a second switching intent associated with a second group from the multiple virtualized computing instances and (c) a routing intent associated with the first group or the second group, or both; and
    mapping the network connectivity intents to a logical network topology template for implementation in the network environment by performing the following:
        (a) based on the first switching intent, assigning the first group to a first logical network domain and configuring the logical network topology template to include a first logical switching element to provide connectivity within the first logical network domain;
        (b) based on the second switching intent, assigning the second group to a second logical network domain and configuring the logical network topology template to include a second logical switching element to provide connectivity within the second logical network domain; and
        (c) based on the routing intent, configuring the logical network topology template to include a logical routing element to provide connectivity between the first logical network domain and the second logical network domain, or connectivity to an external network, or both.

2. The method of claim 1, wherein mapping the network connectivity intents to the logical network topology template comprises:
    configuring the logical network topology template to include the logical routing element in the form of a tier-1 logical router to provide connectivity between the first logical network domain and the second logical network domain.

3. The method of claim 2, wherein mapping the network connectivity intents to the logical network topology template comprises:
    based on the routing intent for connectivity with the external network, configuring the logical network topology template to include the logical routing element in the form of a tier-0 logical router to connect the tier-1 logical router to the external network.

4. The method of claim 1, wherein mapping the network connectivity intents to the logical network topology template comprises:
    based on the first switching intent for layer-2 connectivity within the first group, assigning the first group to the first logical network domain in the form of a layer-2 domain sharing a broadcast domain.

5. The method of claim 1, wherein obtaining the configuration information and traffic information comprises one or more of the following:
    obtaining the configuration information associated with the multiple virtualized computing instances;
    obtaining the configuration information associated with physical or virtual networks in which the multiple virtualized computing instances are currently deployed in the network environment; and
    obtaining the traffic information associated with packet flows among the multiple virtualized computing instances.

6. The method of claim 1, wherein the method further comprises:
    based on the logical network topology template, or a modification thereof, reconfiguring the network environment to include the first logical network domain, the second logical network domain, the first logical switching element, the second logical switching element, and the logical router element.

7. The method of claim 1, wherein the method further comprises:
identifying an enhancement to the logical network topology template, wherein the enhancement includes distributed firewall rule configuration for the multiple virtualized computing instances.

8. A non-transitory computer-readable storage medium that includes a set of instructions which, in response to execution by a processor of a computer system, cause the processor to perform a method of intent-based network virtualization design for a network environment, wherein the method comprises:
obtaining configuration information and traffic information associated with multiple virtualized computing instances deployed in the network environment;
processing the configuration information and traffic information to identify network connectivity intents that include (a) a first switching intent associated with a first group from the multiple virtualized computing instances, (b) a second switching intent associated with a second group from the multiple virtualized computing instances and (c) a routing intent associated with the first group or the second group, or both; and
mapping the network connectivity intents to a logical network topology template for implementation in the network environment by performing the following:
(a) based on the first switching intent, assigning the first group to a first logical network domain and configuring the logical network topology template to include a first logical switching element to provide connectivity within the first logical network domain;
(b) based on the second switching intent, assigning the second group to a second logical network domain and configuring the logical network topology template to include a second logical switching element to provide connectivity within the second logical network domain; and
(c) based on the routing intent, configuring the logical network topology template to include a logical routing element to provide connectivity between the first logical network domain and the second logical network domain, or connectivity to an external network, or both.

9. The non-transitory computer-readable storage medium of claim 8, wherein mapping the network connectivity intents to the logical network topology template comprises:
configuring the logical network topology template to include the logical routing element in the form of a tier-1 logical router to provide connectivity between the first logical network domain and the second logical network domain.

10. The non-transitory computer-readable storage medium of claim 9, wherein mapping the network connectivity intents to the logical network topology template comprises:
based on the routing intent for connectivity with the external network, configuring the logical network topology template to include the logical routing element in the form of a tier-0 logical router to connect the tier-1 logical router to the external network.

11. The non-transitory computer-readable storage medium of claim 8, wherein mapping the network connectivity intents to the logical network topology template comprises:
based on the first switching intent for layer-2 connectivity within the first group, assigning the first group to the first logical network domain in the form of a layer-2 domain sharing a broadcast domain.

12. The non-transitory computer-readable storage medium of claim 8, wherein obtaining the configuration information and traffic information comprises one or more of the following:
obtaining the configuration information associated with the multiple virtualized computing instances;
obtaining the configuration information associated with physical or virtual networks in which the multiple virtualized computing instances are currently deployed in the network environment; and
obtaining the traffic information associated with packet flows among the multiple virtualized computing instances.

13. The non-transitory computer-readable storage medium of claim 8, wherein processing the configuration information and traffic information further comprises:
based on the logical network topology template, or a modification thereof, reconfiguring the network environment to include the first logical network domain, the second logical network domain, the first logical switching element, the second logical switching element, and the logical router element.

14. The non-transitory computer-readable storage medium of claim 8, wherein the method further comprises:
identifying an enhancement to the logical network topology template, wherein the enhancement includes distributed firewall rule configuration for the multiple virtualized computing instances.

15. A computer system, wherein the computer system comprises: a processor; and
a non-transitory computer-readable medium having stored thereon instructions that, when executed by the processor, cause the processor to:
obtain configuration information and traffic information associated with multiple virtualized computing instances deployed in a network environment;
process the configuration information and traffic information to identify network connectivity intents that include (a) a first switching intent associated with a first group from the multiple virtualized computing instances, (b) a second switching intent associated with a second group from the multiple virtualized computing instances and (c) a routing intent associated with the first group or the second group, or both; and
map the network connectivity intents to a logical network topology template for implementation in the network environment by performing the following:
(a) based on the first switching intent, assign the first group to a first logical network domain and configure the logical network topology template to include a first logical switching element to provide connectivity within the first logical network domain;
(b) based on the second switching intent, assign the second group to a second logical network domain and configure the logical network topology template to include a second logical switching element to provide connectivity within the second logical network domain; and
(c) based on the routing intent, configure the logical network topology template to include a logical routing element to provide connectivity between the first logical network domain and the second logical network domain, or connectivity to an external network, or both.

16. The computer system of claim 15, wherein the instructions for mapping the network connectivity intents to the logical network topology template cause the processor to:
configure the logical network topology template to include the logical routing element in the form of a tier-1 logical router to provide connectivity between the first logical network domain and the second logical network domain.

17. The computer system of claim 16, wherein the instructions for mapping the network connectivity intents to the logical network topology template cause the processor to:
based on the routing intent for connectivity with the external network, configure the logical network topology template to include the logical routing element in the form of a tier-0 logical router to connect the tier-1 logical router to the external network.

18. The computer system of claim 15, wherein the instructions for mapping the network connectivity intents to the logical network topology template cause the processor to:
based on the first switching intent for layer-2 connectivity within the first group, assign the first group to the first logical network domain in the form of a layer-2 domain sharing a broadcast domain.

19. The computer system of claim 15, wherein the instructions for obtaining the configuration information and traffic information cause the processor to perform one or more of the following:
obtain the configuration information associated with the multiple virtualized computing instances;
obtain the configuration information associated with physical or virtual networks in which the multiple virtualized computing instances are currently deployed in the network environment; and
obtain the traffic information associated with packet flows among the multiple virtualized computing instances.

20. The computer system of claim 15, wherein the instructions further cause the processor to:
based on the logical network topology template, or a modification thereof, reconfigure the network environment to include the first logical network domain, the second logical network domain, the first logical switching element, the second logical switching element, and the logical router element.

21. The computer system of claim 15, wherein the instructions further cause the processor to:
identify an enhancement to the logical network topology template, wherein the enhancement includes distributed firewall rule configuration for the multiple virtualized computing instances.

* * * * *